United States Patent
Cudak et al.

(10) Patent No.: US 9,569,940 B2
(45) Date of Patent: Feb. 14, 2017

(54) IDENTIFICATION OF PORTS FROM WHICH CABLES HAVE BEEN RECENTLY REMOVED AND THAT HAVE THE SAME PHYSICAL FORM FACTOR USING EXISTING VISUAL PORT INDICATORS

(71) Applicant: Lenovo Enterprise Solutions (Singapore) PTE. LTD., New Tech Park (SG)

(72) Inventors: Gary D. Cudak, Wake Forest, NC (US); Shareef F. Alshinnawi, Apex, NC (US); Edward S. Suffern, Chapel Hill, NC (US); John M. Weber, Wake Forest, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/724,428

(22) Filed: May 28, 2015

(65) Prior Publication Data

US 2016/0351025 A1   Dec. 1, 2016

(51) Int. Cl.
  *G08B 3/00*   (2006.01)
  *G08B 5/38*   (2006.01)
  *H04Q 1/02*   (2006.01)
  *H04Q 1/20*   (2006.01)

(52) U.S. Cl.
  CPC ............... *G08B 5/38* (2013.01); *H04Q 1/136* (2013.01); *H04Q 1/13* (2013.01); *H04Q 1/20* (2013.01)

(58) Field of Classification Search
  CPC ............... G08B 5/38; G08B 5/36; G08B 7/06; G08B 3/10; G08B 17/00; G08B 17/06; G08B 25/008; G08B 7/066; G08B 15/005; G08B 21/0297; H04Q 1/13; H04Q 1/20
  See application file for complete search history.

(56) References Cited

U.S. PATENT DOCUMENTS

| | | | | |
|---|---|---|---|---|
| 5,087,908 A | * | 2/1992 | Sanders, Jr. | G08B 25/008 340/527 |
| 7,563,102 B2 | * | 7/2009 | Nordin | H04Q 1/136 439/49 |
| 8,887,991 B2 | * | 11/2014 | Htay | H04L 41/0869 235/375 |
| 9,210,049 B2 | * | 12/2015 | Polland | H04L 41/22 |
| 9,215,146 B2 | * | 12/2015 | Wakumoto | H04L 41/12 |
| 9,401,078 B2 | * | 7/2016 | Barrett | G08B 5/36 |
| 9,406,205 B2 | * | 8/2016 | Keller | G08B 7/06 |
| 2007/0132503 A1 | * | 6/2007 | Nordin | H04Q 1/136 327/518 |
| 2010/0141466 A1 | * | 6/2010 | Nguyen | H04L 49/30 340/687 |

(Continued)

Primary Examiner — Joseph Feild
Assistant Examiner — Rufus Point
(74) Attorney, Agent, or Firm — Katherine Brown

(57) ABSTRACT

An electronic device has a number of ports that have the same physical form factor and that are receptive to cable insertion. The electronic device also has visual indicators corresponding to the ports. Each visual indicator indicates at least link establishment when a cable has been inserted into its corresponding port and a link has been established. When a cable is removed from a port, the electronic device controls its corresponding visual indicator to identify the port as one from which cable removal has recently occurred.

19 Claims, 3 Drawing Sheets

(56) References Cited

U.S. PATENT DOCUMENTS

| | | | |
|---|---|---|---|
| 2011/0097925 A1* | 4/2011 | Caveney | H04Q 1/149 |
| | | | 439/488 |
| 2012/0154165 A1* | 6/2012 | Bower, III | G06F 15/161 |
| | | | 340/687 |
| 2013/0128758 A1* | 5/2013 | Polland | H04L 41/22 |
| | | | 370/252 |
| 2014/0111346 A1* | 4/2014 | Pinn | H04Q 1/09 |
| | | | 340/691.6 |
| 2015/0052272 A1* | 2/2015 | Malone | H04L 43/0811 |
| | | | 710/113 |
| 2016/0097801 A1* | 4/2016 | Polland | G01R 31/04 |
| | | | 324/538 |
| 2016/0132532 A1* | 5/2016 | German | G06F 17/30259 |
| | | | 382/103 |

\* cited by examiner

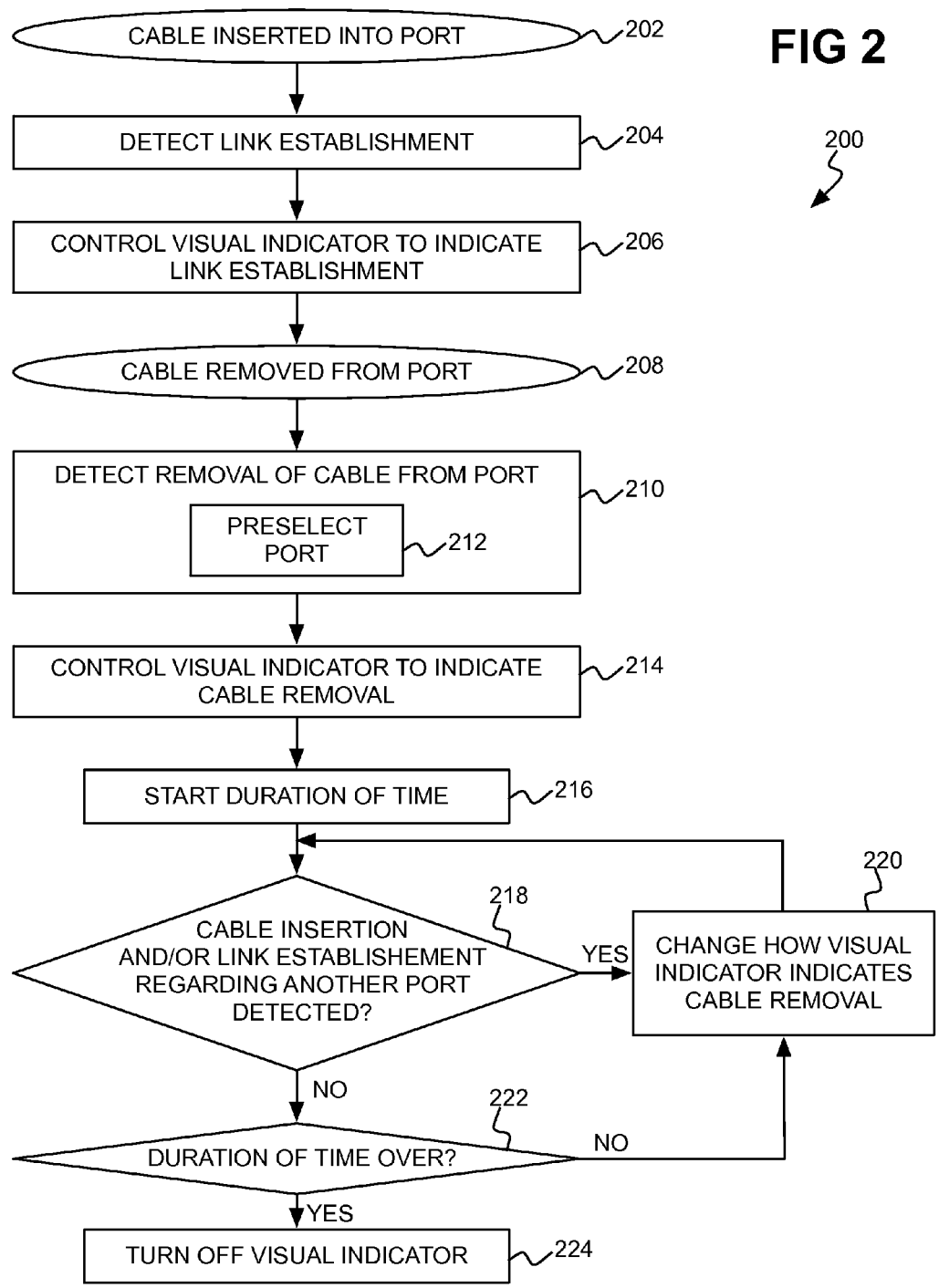

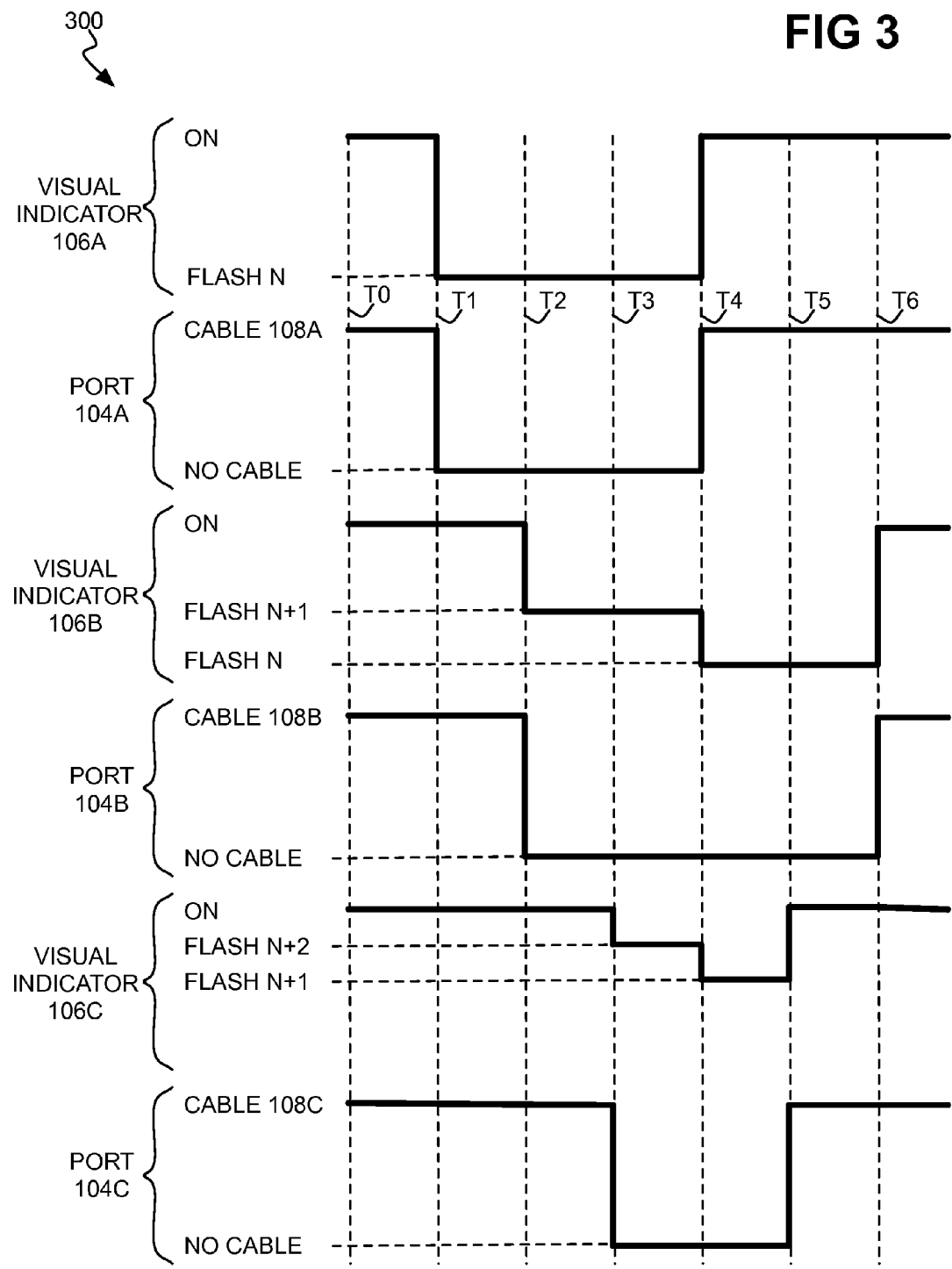

IDENTIFICATION OF PORTS FROM WHICH CABLES HAVE BEEN RECENTLY REMOVED AND THAT HAVE THE SAME PHYSICAL FORM FACTOR USING EXISTING VISUAL PORT INDICATORS

BACKGROUND

Networking devices such as switches are used to interconnect different devices in a wired manner. A switch may have four, eight, sixteen, thirty-two, sixty-four, or even more different ports, or jacks, that look identical and that are receptive to cable insertion. The plug at one end of a network cable is inserted into a port of a switch, and the plug at the other end is inserted into another device, such as another networking device, a computing device, and so on.

SUMMARY

An example method includes detecting, by an electronic device, removal of a cable from a given port of a number of ports of the electronic device that have a same physical form factor and that are receptive to cable insertion. The electronic device has a number of visual indicators corresponding to the ports that each indicate at least link establishment when a cable has been inserted into the corresponding port and a link has been established. The method includes, in response to detecting removal of the cable from the given port, controlling, by the electronic device, the visual indicator corresponding to the given port in a particular manner to identify the given port as a port from which cable removal has occurred, for a duration of time starting at a time of cable removal from the given port.

An example electronic device includes a number of ports having an identical physical form factor and receptive to cable insertion. The device includes a number of visual indicators corresponding to the ports. The device includes a controller to control the visual indicator corresponding to a given port in a first manner upon insertion of a cable into the given port and upon establishment of a link over the given port. The controller is to control the visual indicator corresponding to the given port in a second manner different from the first manner, for just a duration of time starting at a time of cable removal from the given port, upon removal of the cable from the given port, to identify the given port from which the cable has been removed. The second manner identifies the given port from which the cable has been removed from other of the ports in which no cables have been inserted for at least the duration of time.

An example non-transitory computer-readable stores storing computer-executable code executable by an electronic device to detect removal of a cable from a given port of a number of ports of the electronic device that have a same physical form factor and that are receptive to cable insertion. The electronic device has a number of visual indicators corresponding to the ports that each indicate at least link establishment when a cable has been inserted into the corresponding port and a link has been established. The code is executable by the electronic device to, in response to detecting removal of the cable from the given port, control the visual indicator corresponding to the given port in a particular manner to identify the given port from which the cable has been removed, for just a duration of time starting at a time of cable removal from the given port. The particular manner identifies the given port from which the cable has been removed from other of the ports of the electronic device in which no cables have been inserted for at least the duration of time.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 2 is a flowchart of an example method to control a visual indicator for a port when a cable has been recently removed from the port.

FIG. 3 is a timing diagram of example performance of the method of FIG. 2.

DETAILED DESCRIPTION

Figure 1:
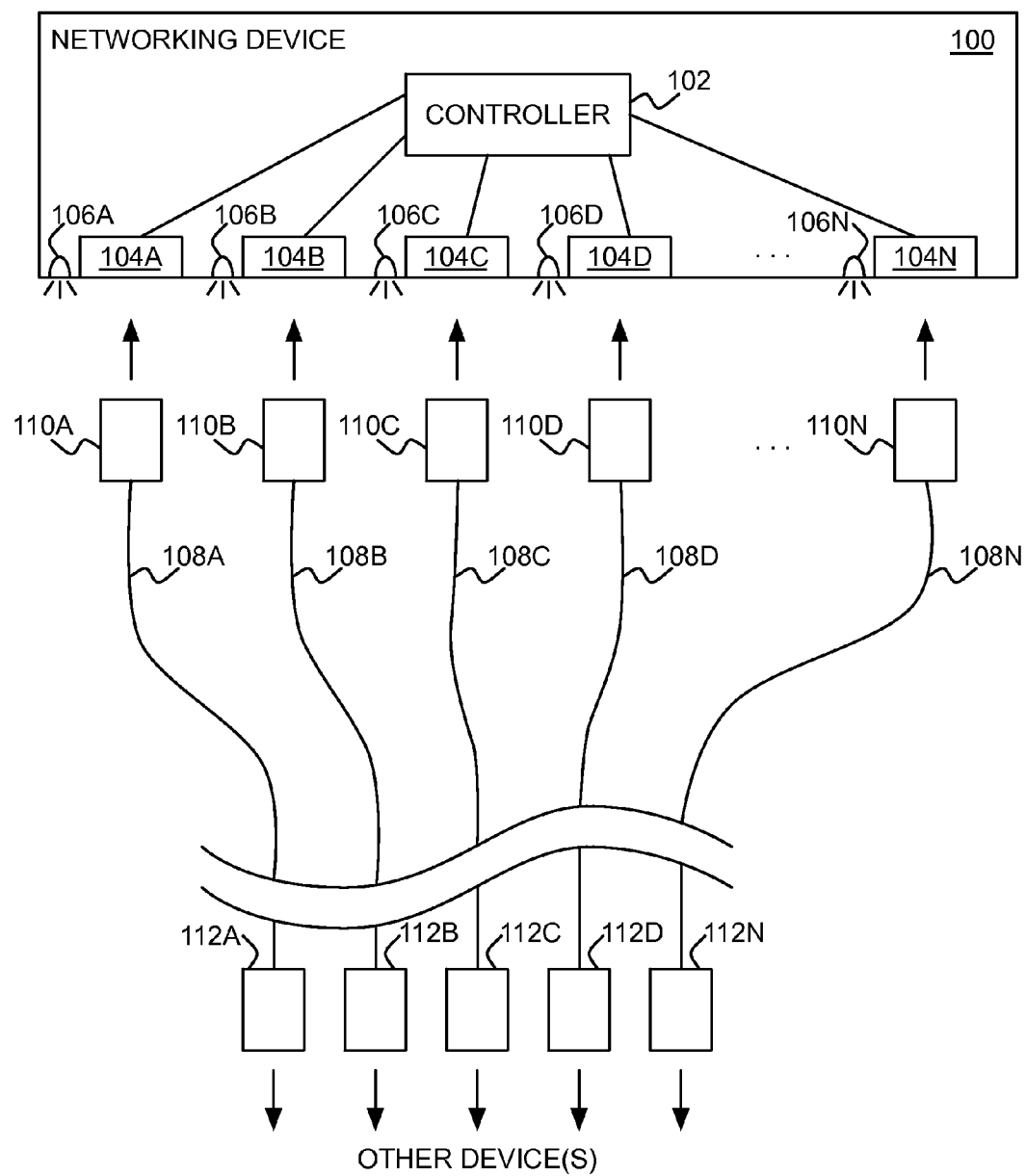
FIG. 1 is a diagram of an example networking device.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, networking devices like switches can include a large number of identically appearing ports. At times, a cable that is currently inserted into a port may have to be removed. For example, the cable may be faulty. As another example, the cable may be replaced by a cable having better specifications, such as one that can provide for faster bandwidth, like CAT6 versus CAT5e or CAT5, or one that has better shielding.

At times, however, the personnel responsible for replacing a cable may forget from which port he or she unplugged the cable. Some types of networking devices can be programmed to provide different features on different ports. In such cases, a replacement cable connecting two devices including a network device has to be plugged into the same port on the networking device to which the original cable was.

Forgetting from which port a cable has been recently unplugged can occur for a variety of different reasons. The personnel responsible for cable replacement may become distracted during the process. There may be a large number of ports on the networking device in question. Not all the ports may currently have cables inserted into them, such that removal of a cable simply increases the number of empty ports by one, heightening the likelihood that the personnel may not remember the exact port from which the cable has been removed.

Techniques disclosed herein identify the ports from which cables have been recently removed. A networking device has a number of ports and a number of corresponding visual indicators, such as light-emitting diodes (LEDs). When a cable is inserted into a port, the corresponding visual indicator may be lit in a particular, such as green, when a communication link has been established with the device to which the other end of the cable is connected. The visual indicator may further flash when data is being communicated over the link. When the cable is removed, the networking device controls the indicator in a particular manner to identify the port as one from which cable removal has recently occurred.

For example, the visual indicator may have its color changed, such as to red or yellow, or its brightness may be changed, such as to be dimmer than usual. The visual indicator may be flashed—that is, turned on and off in a repeating pattern. After a duration of time beginning when cable removal is detected, the visual indicator is turned off if no cable has been inserted into the port in question. Therefore, personnel can easily distinguish a port from which a cable has been recently removed from other ports that have not had cables plugged into them for a longer duration of time, if ever.

FIG. 1 shows an example networking device 100, which is a type of electronic device. The networking device 100 may be a router, a switch, or another type of networking device. The networking device 100 includes a controller 102. The controller 102 may be implemented completely in hardware, such as an application-specific integrated circuit (ASIC), a field-programmable gate array (FPGA), and so on. The controller 102 may further be implemented in a combination of software and hardware. For example, a processor may execute computer-executable code stored on a non-transitory computer-readable data storage medium. The controller 102 performs the functionality of the networking device 100, such as routing functionality, switching functionality, and so on.

The networking device 100 includes ports 104A, 104B, 104C, 104D, . . . , 104N, collectively referred to as the ports 104. Examples of ports 104 include those having the RJ45 form factor. The ports 104 have the same physical form factor. The device 100 includes visual indicators 106A, 106B, 106C, 106D, . . . , 106N, collectively referred to as the visual indicators 106. Each port 104 has a corresponding visual indicator 106: the port 104A and the indicator 106A correspond to one another; the port 104B and the indicator 106B correspond to one another; and so on. Examples of visual indicators 106 include LEDs as well as other types of visual indicators.

Cables 108A, 108B, 108C, 108D, . . . , 108N, collectively referred to as cables 108 terminate in plugs or jacks 110A, 110B, 110C, 110D, . . . , 110N, collectively referred to as plugs or jacks 110, at one end. Examples of cables 108 include CAT5, CAT5e, and CAT6 cables. The cables 108 can terminate in plugs or jacks 112A, 112B, 112C, 112D, . . . , 112N, collectively referred to as plugs or jacks 112, at their opposite end. Examples of plugs and jacks 110 and 112 include those having the RJ45 form factor. The cables 108 can be plugged into the ports 104 of the networking device 100 via insertion of their plugs of jacks 110 into the ports 104. The other ends of the cables 108, such as via the plugs or jacks 112, can be plugged into other device(s). As such, each cable 108 permits the networking device 100 to communicatively interconnect in a wired manner with a different device.

FIG. 2 shows an example method 200 that the networking device 100 can perform to visually indicate the recent removal of a cable 108 from a port 104 of the device 100. The controller 102 of the networking device 100 performs the method 200. The method 200 may be performed asynchronously and in parallel for each port 104 in one implementation.

When a cable 108 is inserted into a port 104 (202), the device 100 can detect that a link has been established between the networking device 100 and another device connected to the other end of the cable 108 (204). A link can be a communications link. For example, the networking device 100 and the other device may perform automatic negotiation to establish a maximum speed at which they can communicate with one another. Once such negotiation has been finished and the networking device 100 and the other device are in a state in which they can communicate with one another over the cable 108, it is said that a communication link has been established between the two devices.

In response, the networking device 100 controls the visual indicator 106 corresponding to the port 104 in question in a particular manner to indicate that the communication link has been established (206). As one example, the device 100 may illuminate the visual indicator 106 where previously it was not illuminated, and in a certain color, such as green. In some implementations, when data is being communicated over the link, the device 100 may flash the indicator 106 as data is being transmitted.

The cable 108 at some point is removed from the port 104 (208). The networking device 100 detects the removal of the cable 108 from the port 104 (210). For example, when the link between the networking device 100 and the other device connected to the cable 108 is terminated, the networking device 100 can in such an implementation conclude that the cable 108 has been removed. In other implementations, cable removal can be detected in other ways.

In one implementation, detection of cable removal is said to include preselection of the port 104 in question (212). Most generally, any port 104 that has a cable 108 inserted into it and/or that is part of a link with another device can be considered as being preselected. However, it may be desired that cable removal detection occur just as to ports 104 that are part of established links that are performing unsatisfactorily. For example, just links failing cyclic redundancy checks (CRCs) may have their corresponding ports 104 preselected, or just links in which network traffic thereon is indicative of system issues may have their corresponding ports 104 preselected. In such more specific cases, cable removal from a port 104 is not detected if the port 104 has not been preselected in this manner.

In response to detecting that the cable 108 has been removed from the port 104, the networking device 100 controls the corresponding visual indicator 106 in a different particular manner to indicate that cable removal has occurred (214). As such, this port 104 is visually identified as a port 104 from which cable removal has recently occurred. In this way, the port 104 is distinguishably identified from other ports 104 that do not have cables 108 inserted into them and from which cables 108 have not been recently removed. The visual indicators 106 for such other ports 104 typically are turned off.

Controlling the corresponding visual indicator 106 to signify recent cable removal can be achieved in a number of different ways. For example, the color of the visual indicator 106 may be changed to (i.e., illuminated in) a different specified color, such as red or yellow, which is selected to signify cable removal. As another example, the brightness of the visual indicator 106 may be dimmed while remaining the same color, or in conjunction with having its color changed. That is, the visual indicator 106 may be illuminated at a specified brightness selected to denote cable removal.

As a third example, the networking device 100 may flash the visual indicator 106 in a particular specified pattern selected to denote cable removal. For instance, for every period of T seconds, the device 100 may flash the indicator 106 N times, wait one or more seconds, and then flash the visual indicator 106 in this pattern again. If another visual indicator 106 corresponding to another port 104 from which a cable 108 has been recently removed is already flashing in this way, then N may be incremented or decremented. In this way, the temporal order in which cables 108 have been from multiple ports 104 can be signified as well. For example, the first port 104 from which a cable 108 has been removed may be flashed N times in the period of time in question, the second port 104 from which the cable 108 has been removed may be flashed N+1 or N−1 times, and so on.

In another implementation, the pattern in which the visual indicator 106 is flashed may vary while the networking device 100 is controlling the indicator 106 to indicate cable removal from the port 104 in question. For example, the flashing may occur at a higher frequency at first, and the frequency at which flashing occurs may slowly decay until the visual indicator 106 is ultimately turned off, or vice-versa. Other ways in which the visual indicator 106 can be controlled to indicate recent cable removal can also be employed by the networking device 100.

At the time the networking device 100 has detected removal of the cable 108 from the port 104 and has begun controlling the visual indicator 106 for the port 104, the device 100 starts a duration of time (216). The duration of time is the length of time in which the visual indicator 106 is controlled by the device 100 to indicate recent cable removal from the port 104. As such, recency in cable removal can be defined as equal to this duration of time, since once the duration of time has expired, the visual indicator 106 is turned off. This duration of time may be predefined to a default value, and may further be changed by a user to a different, finite period of time. For example, the period of time may be measured in minutes less than an hour, and hours less than a day.

While this duration of time has not yet expired, a cable 108 may be been inserted into another port 104 from which cable removal recently occurred and/or a link may have been established on this other port 104. In one implementation, in response to such detection (218), the networking device 108 changes how the visual indicator 106 for the port 104 in relation to which the method 200 is being performed indicates cable removal (220). An example of this process is described in detail later in the detailed description in relation to FIG. 3. Ultimately, once the duration of time has expired (222), the networking device 100 turns off the visual indicator 106 for the port 104 in question.

FIG. 3 shows a timing diagram 300 depicting example performance of the method 200, including an implementation in which part 220 is performed. The example of FIG. 3 is described in relation to three ports 104A, 104B, and 104C and their corresponding visual indicators 106A, 106B, and 106C, respectively. Seven times T0, T1, T2, T3, T4, T5, and T6 are identified in FIG. 3. For purposes of description, the length of time between T6 and T1 is less than the duration of time of part 216 of the method 200 in which a visual indicator 106 is controlled to indicate recent cable removal from a corresponding port 104.

At time T0, each port 104A, 104B, and 104C already has a cable 108A, 108B, and 108C, respectively, plugged into the port, and the corresponding visual indicators 106A, 106B, and 106C are all on. At time T1, the cable 108A plugged into the port 104A is removed. This removal is detected in part 210 of the method 200, and the visual indicator 106A is controlled in part 214 of the method 200 to indicate recent cable removal, by flashing the indicator 106A N times in each repeating period of time.

At time T2, the cable 108B plugged into the port 104B is removed. This removal is detected in part 210 of the method 200, and the visual indicator 106B is controlled in part 214 of the method 200 to indicate recent cable removal, by flashing the indicator 106B N+1 times in each repeating time period. Flashing the visual indicator 106B N+1 times as compared to flashing the indicator 106A N times identifies the temporal order in which cable removal recently occurred from the ports 104A and 104B.

At time T3, the cable 108C plugged into the port 104C is removed. This removal is detected in part 210 of the method 200, and the visual indicator 106C is controlled in part 214 of the method 200 to indicate recent cable removal, by flashing the indicator 106C N+2 times in each repeating period of time. Flashing the visual indicator 106C N+2 times as compared to flashing the indicator 106B N+1 times and the indicator 106A N times identifies the temporal order in which cable removal recently occurred from the ports 104A, 104B, and 104C.

At time T4, a cable 108A is plugged into the port 104A. Cable insertion is detected in part 204 (as part of link establishment detection, for instance) of the method 200, and the visual indicator 106A is controlled in part 206 of the method 200 to indicate this, by turning on the indicator 106A. Furthermore, the visual indicator 106B for the port 104B is controlled in part 220 to change the number of times it flashes in each repeating time period from N+1 times to N times. Similarly, the visual indicator 106C for the port 104C is controlled in part 220 to change the number of times it flashes from N+2 times to N+1 times.

Changing how the visual indicators 106B and 106C are controlled in part 220 maintains that the port 104 from which cable removal least recently occurred has its visual indicator 106 flash N times, that the port 104 from which cable removal next least recently occurred has its indicator 106 flash N+1 times, and so on. Once the cable 108A has been plugged into the port 104A at time T4, in other words, the port 104B becomes the port 104 from which cable removal least recently occurred. Therefore, its visual indicator 106B is flashed at N times now instead of N+1 times. Similarly, once the cable 108A has been plugged into the port 104A at time T4, the port 104C becomes the port 104 from which cable removal next least recently occurred, and thus its indicator 106C is flashed at N+1 times now instead of N times.

At time T5, a cable 108C is plugged into the port 104C. Cable insertion is detected in part 204 of the method 200, and the visual indicator 106C is controlled in part 206 of the method 200 to indicate this, by turning on the indicator 106C. The port 104B remains the port 104 from which cable removal least recently occurred, and as such its visual indicator 106B does not have its flashing changed in part 220 as was performed at time T4. Finally, at time T6, a cable 108B is plugged into the port 104B, and this cable insertion is detected in part 204. The corresponding visual indicator 106B is controlled in part 206 to indicate this, by turning on the indicator 106B.

The techniques that have been described above permit personnel to discern the ports 104 from which cables 108 have been recently removed, by controlling the visual indicators 106 for the ports 104 in a novel manner. The visual indicators 106 may already exist on the networking device 100 to indicate link establishment and data communication. Therefore, in some implementations, no further hardware may have to be added to a device 100 to utilize the techniques described herein, but rather just a reprogramming or updating of the controller 102.

Furthermore, although the techniques have been described herein in relation to a networking device 100 having ports 104 receptive to insertion of network cables 108, they can be applied to other types of electronic devices having other types of ports, or connectors, which are receptive to insertion of other types of cables. In such implementations, detection of link establishment can mean that connection of the cable between the electronic device in which the techniques described herein have been applied and a different electronic device is detected. A link in this respect is thus a detectable connection between two electronic devices, including at least one in which the techniques described herein have been applied.

It is therefore noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
    detecting, by an electronic device, removal of a cable from a given port of a plurality of ports of the electronic device that have a same physical form factor and that are receptive to cable insertion, the electronic device having a plurality of visual indicators corresponding to the ports that each indicate at least link establishment when a cable has been inserted into the corresponding port and a link has been established;
    in response to detecting removal of the cable from the given port, controlling, by the electronic device, the visual indicator corresponding to the given port in a particular manner to identify the given port as a port from which cable removal has occurred, for a duration of time starting at a time of cable removal from the given port; and
    in response to the duration of time expiring and no cable having been inserted into the given port, turning off, by the electronic device, the visual indicator.

2. The method of claim 1, wherein the particular manner distinguishes the given port, from which the cable has been removed, from other of the ports of the electronic device in which no cables have been inserted for at least the duration of time.

3. The method of claim 1, wherein detecting removal of the cable from the given port comprises:
    preselecting the given port as any port of the electronic device into which a cable has been inserted.

4. The method of claim 1, wherein detecting removal of the cable from the given port comprises:
    preselecting the given port as any port of the electronic device into which a cable has been inserted and having an established link that is performing unsatisfactorily.

5. The method of claim 1, wherein controlling the visual indicator corresponding to the given port in the particular manner to identify the given port comprises:
    illuminating the visual indicator in a color selected to denote cable removal.

6. The method of claim 1, wherein controlling the visual indicator corresponding to the given port in the particular manner to identify the given port comprises:
    illuminating the visual indicator at a brightness selected to denote cable removal.

7. The method of claim 1, wherein controlling the visual indicator corresponding to the given port in the particular manner to identify the given port comprises:
    flashing the visual indicator in a particular pattern selected to denote cable removal.

8. The method of claim 7, wherein the particular pattern changes over the duration of time.

9. The method of claim 7, wherein the cable is a first cable, the given port is a first given port, and the particular pattern is a first particular pattern, the method further comprising:
    while no cable has been inserted into the first given port, detecting, by the electronic device, removal of a second cable from a second given port of the ports;
    in response to detecting removal of the second cable from the second given port, flashing, by the electronic device, the visual indicator corresponding to the second given port in a second particular pattern selected to denote cable removal, for the duration of time starting at a time of cable removal from the second given port,
    wherein the second particular pattern is different from the first particular pattern to signify a temporal order of cable removal from the first given port and the second given port.

10. The method of claim 9, further comprising:
    while no cable has been inserted into the first given port and no cable has been inserted into the second given port, detecting, by the electronic device, removal of a third cable from a third given port of the ports;
    in response to detecting removal of the third cable from the third given port, flashing, by the electronic device, the visual indicator corresponding to the third given port in a third particular pattern selected to denote cable removal, for the duration of time starting at a time of cable removal from the third given port,
    wherein the third particular pattern is different from the first particular pattern and from the second particular pattern to signify the temporal order of cable removal from the first given port, the second given port, and the third given port;
    in response to detecting cable insertion into the first given port while no cable has been inserted into the second given port and no cable has been inserted into the third given port,
        changing, by the electronic device, the third particular pattern in which the visual indicator corresponding to the third given port is flashing to the second particular pattern, and the second particular pattern in which the visual indicator corresponding to the second given port is flashing to the first particular pattern.

11. An electronic device comprising:
    a plurality of ports having an identical physical form factor and receptive to cable insertion;
    a plurality of visual indicators corresponding to the ports; and
    a controller to:
        control the visual indicator corresponding to a given port in a first manner upon insertion of a cable into the given port and upon establishment of a link over the given port;
        control the visual indicator corresponding to the given port in a second manner different from the first manner, for just a duration of time starting at a time of cable removal from the given port, upon removal of the cable from the given port, to identify the given port from which the cable has been removed; and
        in response to the duration of time expiring and no cable having been inserted into the given port, turn off the visual indicator, wherein the second manner identifies the given port from which the cable has been removed from other of the ports in which no cables have been inserted for at least the duration of time.

12. The electronic device of claim 11, wherein the controller is to control the visual indicator corresponding to the given port in the second manner just if the link over the given port is performing unsatisfactorily prior to removal of the cable from the given port.

13. The electronic device of claim 11, wherein the second manner comprises one of:
illumination in a specified color corresponding to cable removal;
illumination at a specified brightness corresponding to cable removal.

14. The electronic device of claim 11, wherein the second manner comprises:
flashing in a specified pattern corresponding to cable removal.

15. The electronic device of claim 14, wherein the specified pattern is a frequency that increases or decreases over the duration of time.

16. The electronic device of claim 14, wherein the given port is a first given port, and the controller is further to:
control the visual indicator corresponding to a second given port in the first manner upon insertion of a cable into the second given port and upon establishment of a link over the second given port; and
control the visual indicator corresponding to the second given port in a third manner different from the second manner, for just a duration of time starting at a time of cable removal from the second given port, upon removal of the cable from the second given port while no cable has been inserted into the first given port, to identify the second given port from which the cable has been removed,
wherein the third manner is different from the first pattern to signify a temporal order of cable removal from the first given port and the second given port.

17. A non-transitory computer-readable medium storing computer-executable code executable by an electronic device to:

detect removal of a cable from a given port of a plurality of ports of the electronic device that have a same physical form factor and that are receptive to cable insertion, the electronic device having a plurality of visual indicators corresponding to the ports that each indicate at least link establishment when a cable has been inserted into the corresponding port and a link has been established;

in response to detecting removal of the cable from the given port, control the visual indicator corresponding to the given port in a particular manner to identify the given port from which the cable has been removed, for just a duration of time starting at a time of cable removal from the given port; and in response to the duration of time expiring and no cable having been inserted into the given port, turn off the visual indicator, wherein the particular manner identifies the given port from which the cable has been removed from other of the ports of the electronic device in which no cables have been inserted for at least the duration of time.

18. The non-transitory computer-readable medium of claim 17, wherein the computer-executable code is executable by the electronic device to further:
preselect the given port as any port of the electronic device into which a cable has been inserted and having an established link that is performing unsatisfactorily.

19. The non-transitory computer-readable medium of claim 17, wherein the computer-executable code is executable by the electronic device to control the visual indicator corresponding to the given port in the particular manner to identify the given port by one of:
illuminating the visual indicator in a color selected to denote cable removal;
illuminating the visual indicator at a brightness selected to denote cable removal;
flashing the visual indicator in a particular pattern selected to denote cable removal.

* * * * *